Sept. 14, 1965 J. L. SZONNTAGH 3,205,701
FLUID ANALYZING SYSTEMS
Filed Nov. 7, 1961 10 Sheets-Sheet 1

Sept. 14, 1965  J. L. SZONNTAGH  3,205,701
FLUID ANALYZING SYSTEMS
Filed Nov. 7, 1961  10 Sheets-Sheet 2
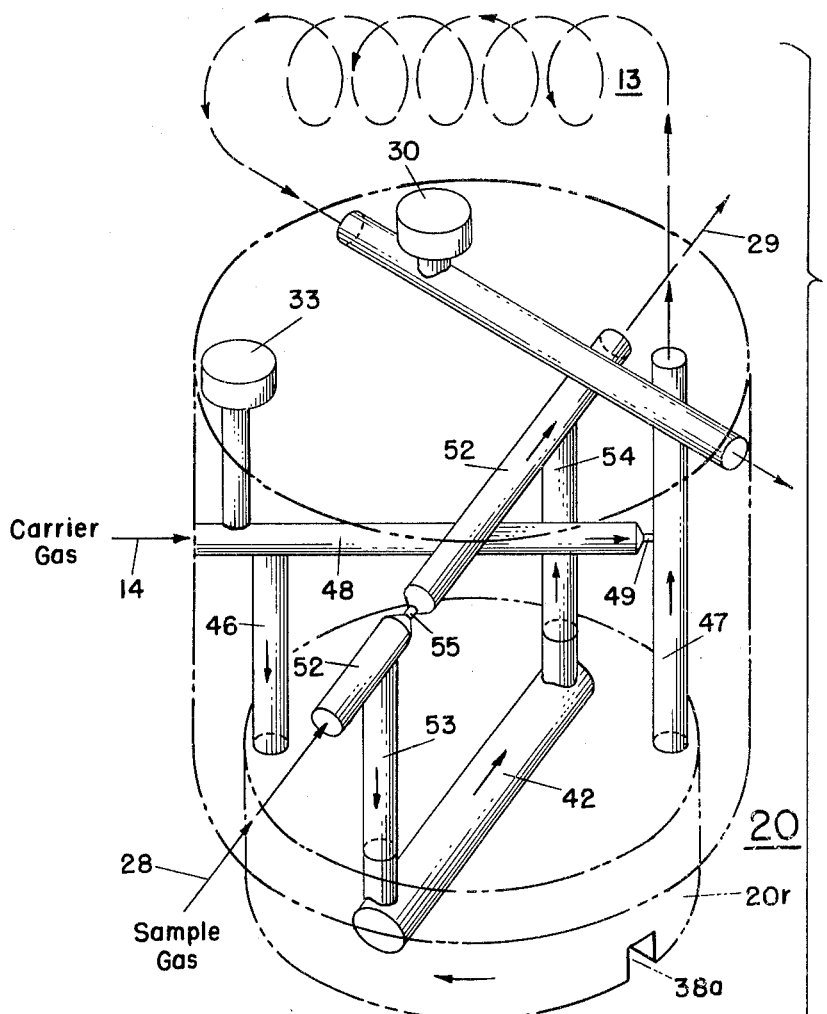
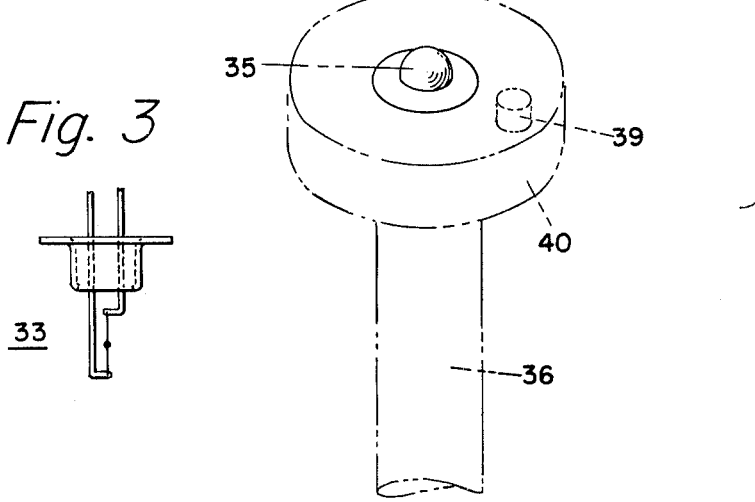

Sept. 14, 1965  J. L. SZONNTAGH  3,205,701
FLUID ANALYZING SYSTEMS
Filed Nov. 7, 1961  10 Sheets-Sheet 4
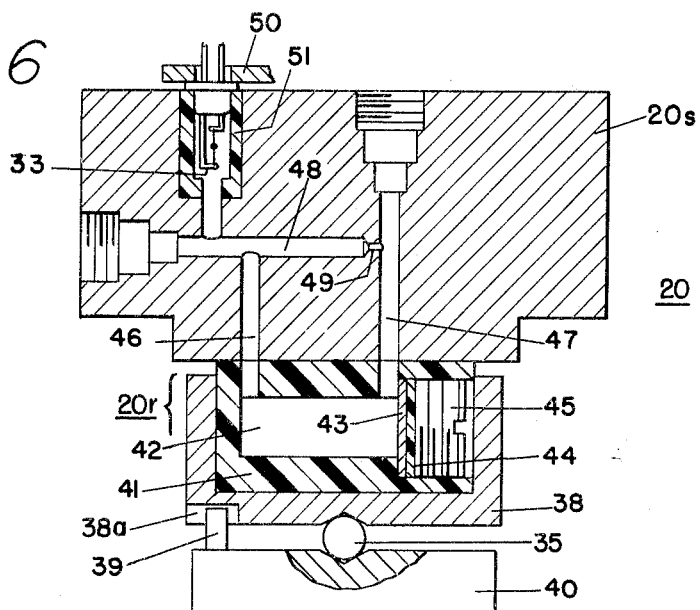
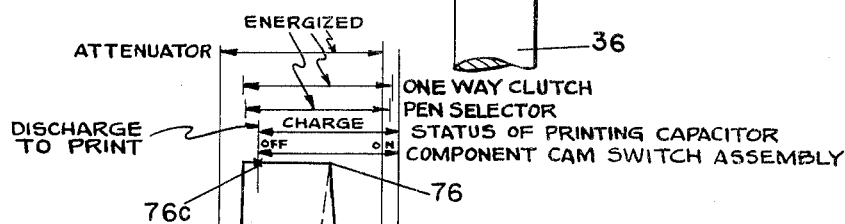
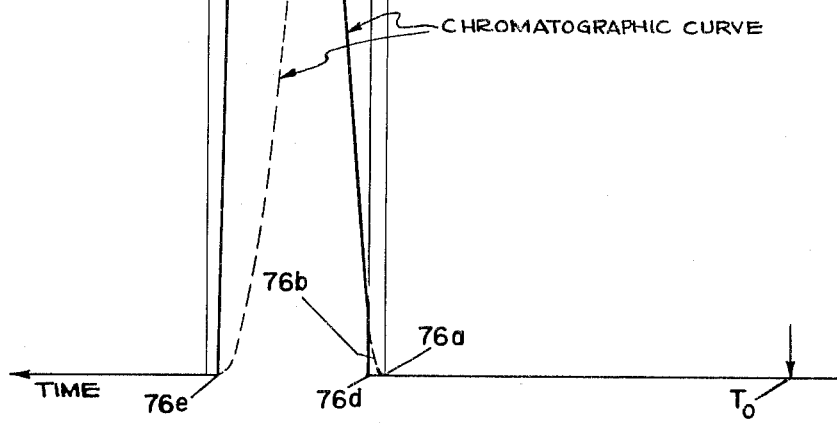

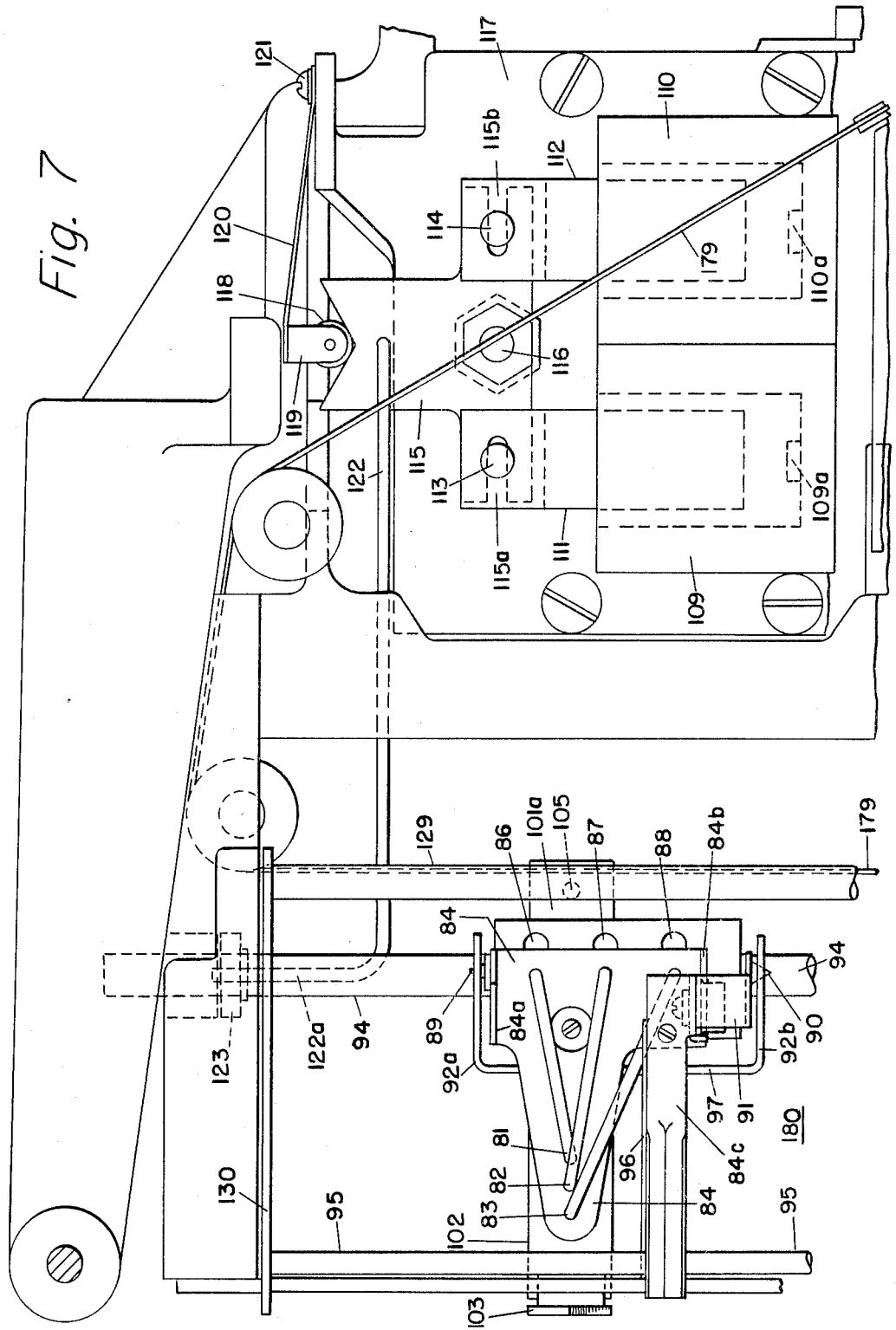

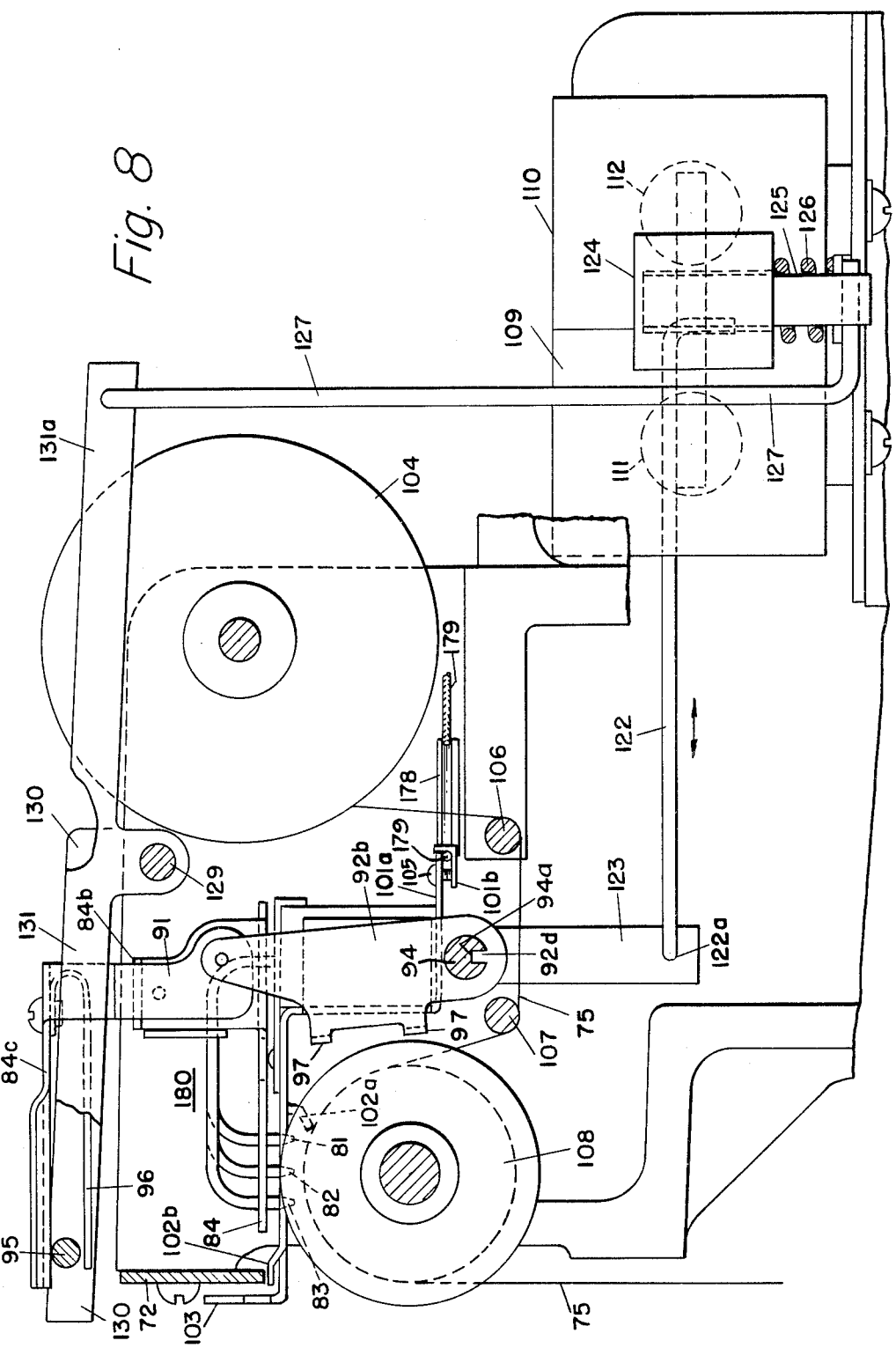

Sept. 14, 1965     J. L. SZONNTAGH     3,205,701

FLUID ANALYZING SYSTEMS

Filed Nov. 7, 1961     10 Sheets-Sheet 7

Sept. 14, 1965 J. L. SZONNTAGH 3,205,701
FLUID ANALYZING SYSTEMS
Filed Nov. 7, 1961 10 Sheets-Sheet 8

Fig. 10

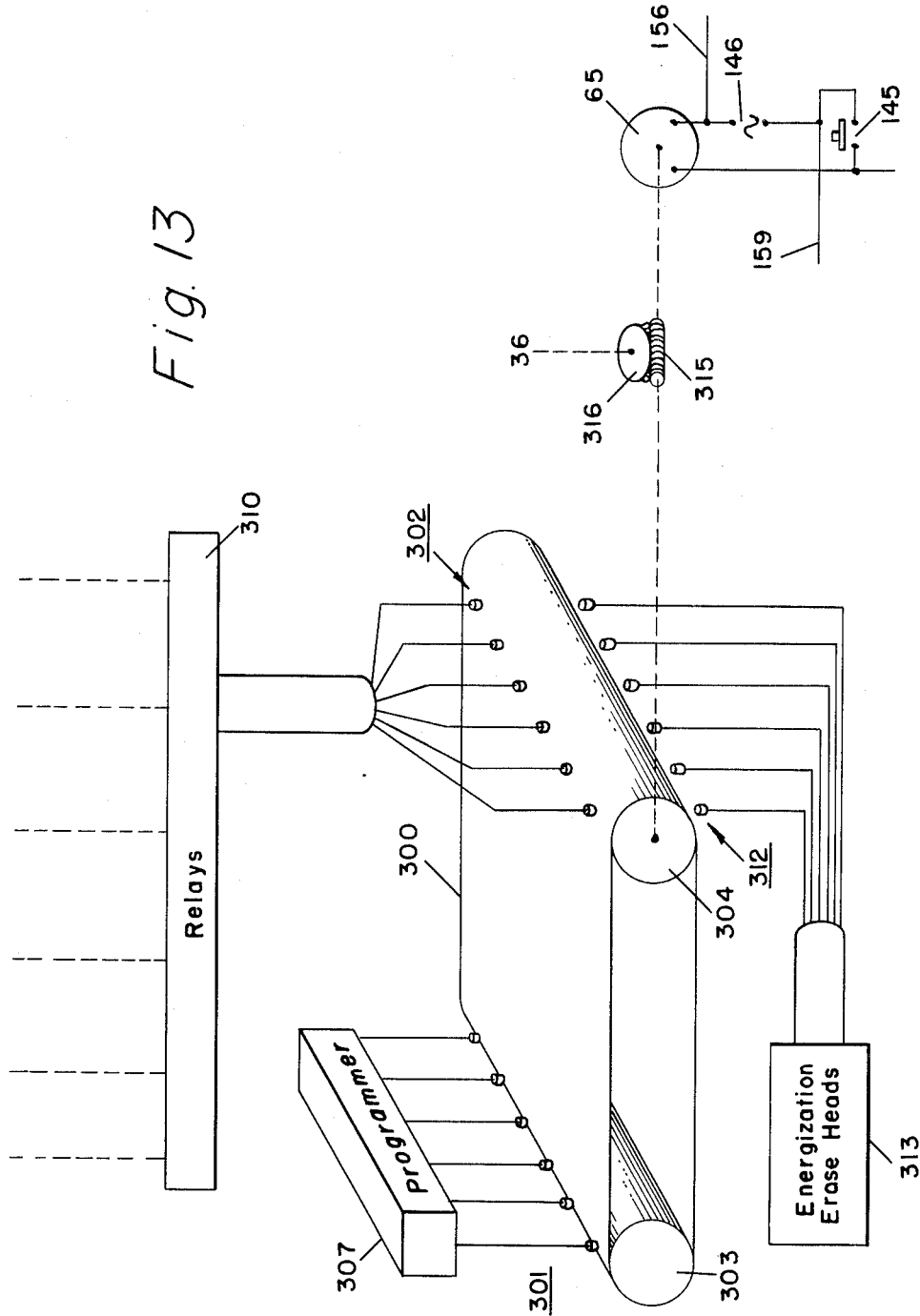

United States Patent Office 3,205,701
Patented Sept. 14, 1965

3,205,701
FLUID ANALYZING SYSTEMS
Jeno L. Szonntagh, Wyncote, Pa., assignor to Leeds and Northrup Company, Philadelphia, Pa., a corporation of Pennsylvania
Filed Nov. 7, 1961, Ser. No. 150,783
16 Claims. (Cl. 73—23.1)

This invention relates to fluid analyzers, more particularly of the chromatographic type and has for an object the provision of a reliable chromatographic analyzer adapted to a multiplicity of applications.

In gas chromatography, as gas sample is caused to flow through a column, generally in the form of a tube, packed with a suitable material, such for example, as charcoal, ground fire brick impregnated with selected liquids, or the like. As well understood by those skilled in the art, a sample gas in mixture with a carrier gas flows through the column and by reason of the interaction between the packing material and the various components in the sample, the several components appear at the exit end of the column in succession.

Inasmuch as the order of appearance of the components will depend upon the nature of the sample and upon the character of the packing material and the nature of the carrier gas, considerable complications are introduced in producing by a single recorder in reproducible fashion complete chromatograms and a record of just the peak amplitude signals, generated by selected components which are indicative of the quantity of each component as it appears at the exit of the chromatographic column. Heretofore, it has been customary to drive a recorder pen to produce chromatograms or to reproduce in succession an indication of the several peaks indicative of the components of the sample gas as bar graphs. The end result has been that on a single chart there will appear a succession of parallel lines indicating peaks which upon repeated analysis of samples will be cyclically reproduced in groups. Thus, if a change in the percentage of one component takes place, the chart must be selectively read so that peaks in one group of bar graphs can be compared with corresponding peaks of another group.

In accordance with the present invention, provision is made for the recording of chromatograms or peak values only. The latter form of recording produces a record of each component as by a series of successively appearing dots on the chart which, if of changing position, immediately indicates the trend of the change of each component. As pointed out above, the recorder may also be operated to produce, as a whole, a conventional chromatographic record with the peaks illustrated in their entirety by the spikes in the chromatogram.

Further in accordance with the invention, the fluid analysis, though of the batch type, nevertheless is carried out continuously. To this end, a sample-introducing valve is continuously operated by a timing motor, also utilized to drive a plurality of timing cams which in conjunction with an associated programming and control system assures the recording of the several components in the manner indicated above.

During the operation of the chromatographic analyzer, the flow of carrier gas to the column is maintained at a constant value and at a fixed and predetermined temperature. It is utilized for taking the sample from the volumetric cavity of the sample-introducing valve for discharge into the column of a precisely determined volume of sample gas to be analyzed, the carrier gas performing as well its usual function of eluting the several components in succession from the column.

In carrying out the present invention in a preferred form thereof, the sample-introducing valve has a stationary portion which is utilized for the support of the reference element and of the measuring element of a measuring system, the reference element having a sensitive device disposed within the flow path of the carrier gas, and the measuring element having its sensitive device disposed in the flow path at the exit end of the chromatographic column. The rotatable element of the valve includes a chamber or cavity of predetermined volume which in one position of the valve is filled with the sample gas, and in another position of the valve permits the carrier gas to force the measured quantity of sample into the column. The flow connections for both the sample gas and the carrier gas include flow restrictions in flow paths through which each gas may continually flow. The flow connections controlled by the rotatable element of the valve comprise by-pass connections in parallel with the flow restrictions. By reason of these provisions, taken in conjunction with the flow resistance of the column itself, there is assured uniformity of flow of the carrier gas and substantial uniformity of flow of the sample gas for all positions of the valve. The rotatable part of the valve is driven by a timing motor which also drives a plurality of control cams which, in association with a programming and control system, provide for the automatic and cyclical measurement and recording of the components in first one sample and then succeeding samples of the gas to be analyzed.

The timing motor, program cam-operated switches, the valve as a whole, together with the chromatographic column, a preheater for the carrier gas and a preheater coil for the sample gas are distributed within an explosion-proof enclosure, the inner valve-containing compartment being maintained at a predetermined temperature in avoidance of variations in operation due to changes in ambient temperature. In conjunction with the foregoing features are other desirable provisions hereinafter to be described in detail.

For further objects and advantages of the invention and for examples of typical apparatus for achieving the same, reference is to be had to the following detailed description taken in conjunction with the accompanying drawings, in which:

FIG. 1 diagrammatically illustrates a part of the chromatographic apparatus with certain of the parts in section;

FIG. 2 is an isometric view of the gas passages associated with the sample-introducing valve, the outline thereof being for the most part indicated in phantom;

FIG. 3 is a side elevation of a measuring element;

Figure 5:
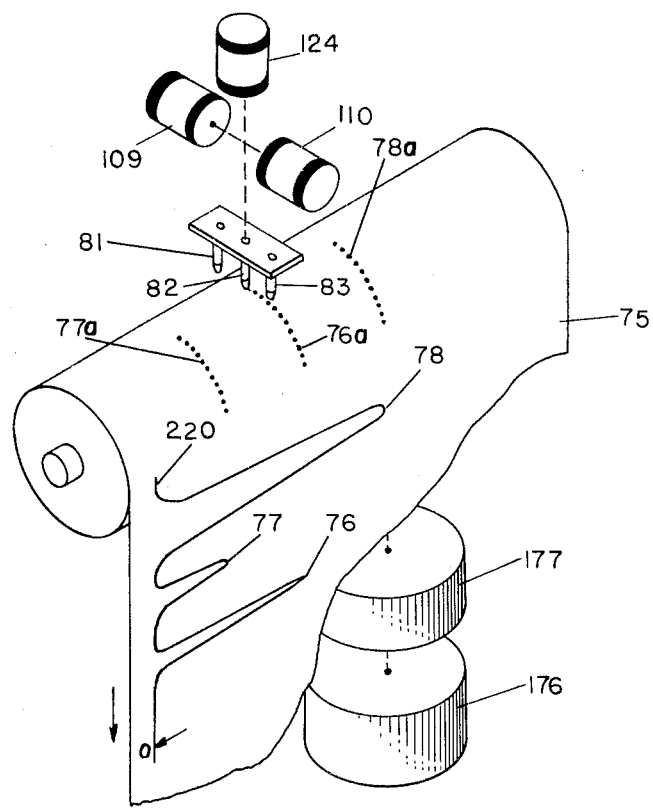
Figure 9:
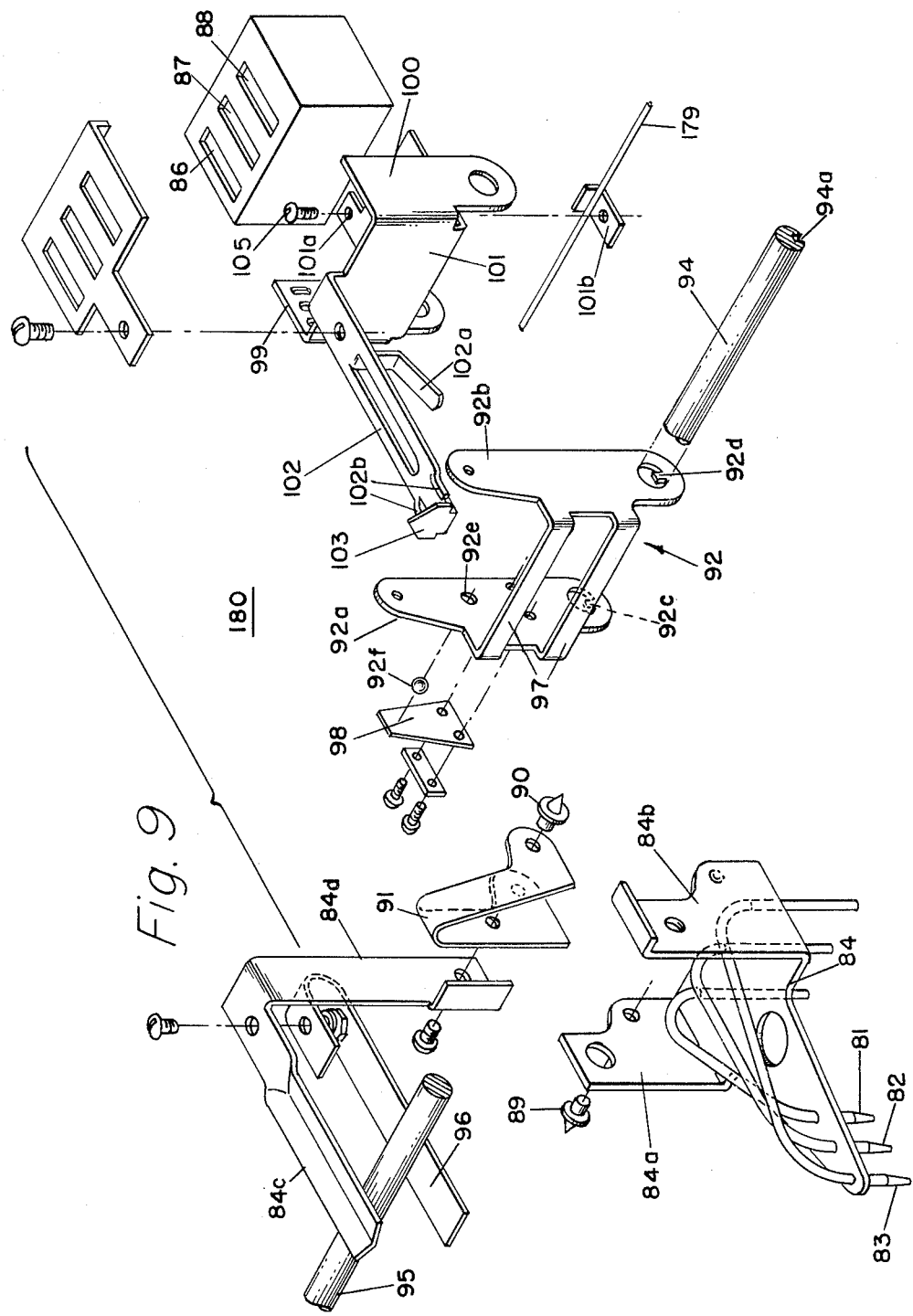
Figure 11:
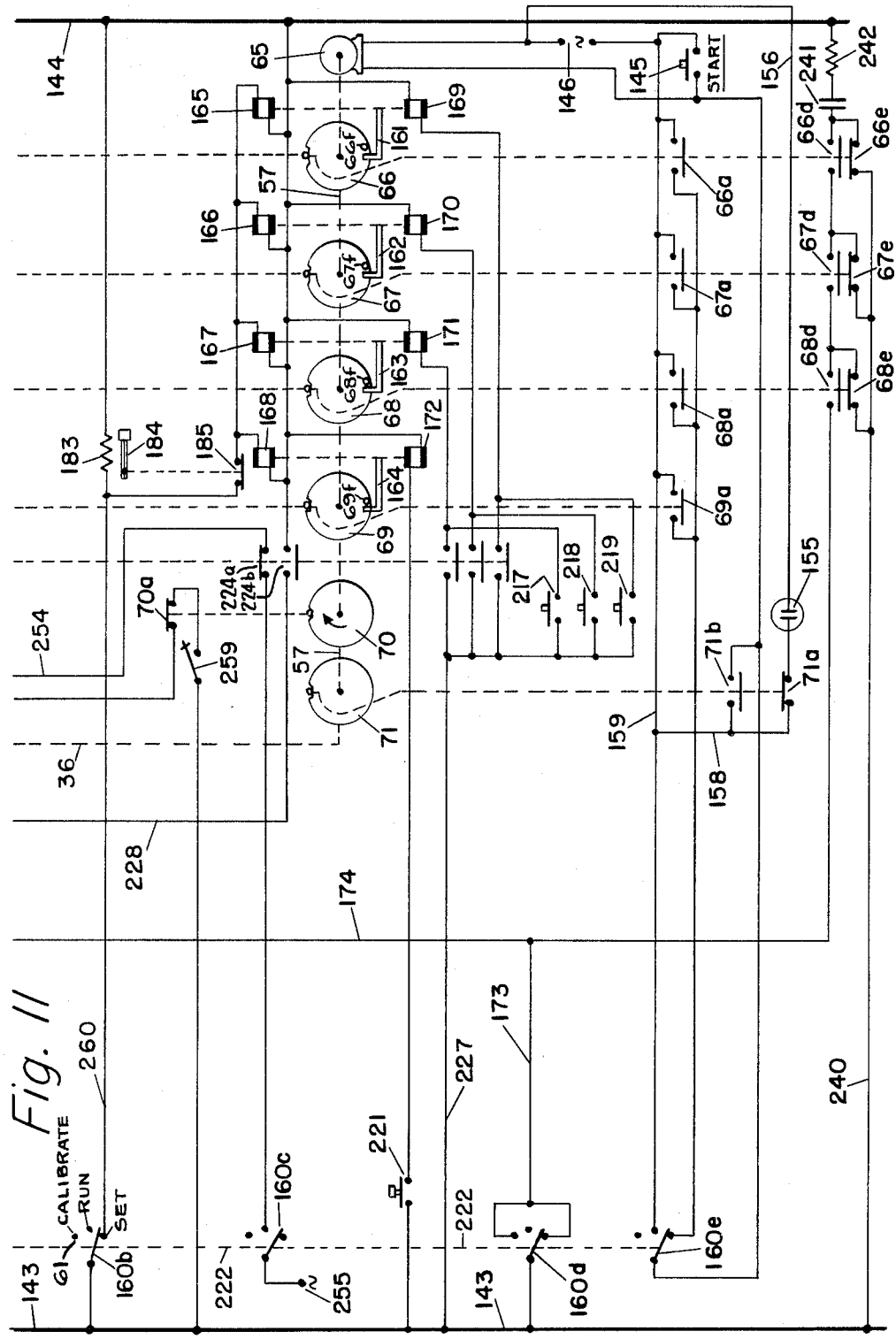

FIG. 5 diagrammatically illustrates a portion of the recorder, its chart, a typical chromatogram, and a record of the peak values of a multiplicity of measurements of three selected components of a sample gas;

FIG. 6 is an enlarged sectional view of the sample-introducing valve;

FIG. 7 is a plan view of a part of the recorder;

FIG. 8 is a side view, partly in section, of the recorder;

FIG. 9 is an exploded isometric view of certain of the parts of the pen and carriage assembly of the recorder;

FIGS. 10 and 11 together form a wiring diagram of the system;

FIG. 12 is a timing diagram useful in explanation of the operation of the invention; and FIG. 13 schematically illustrates a modification of the invention.

Figure 1:
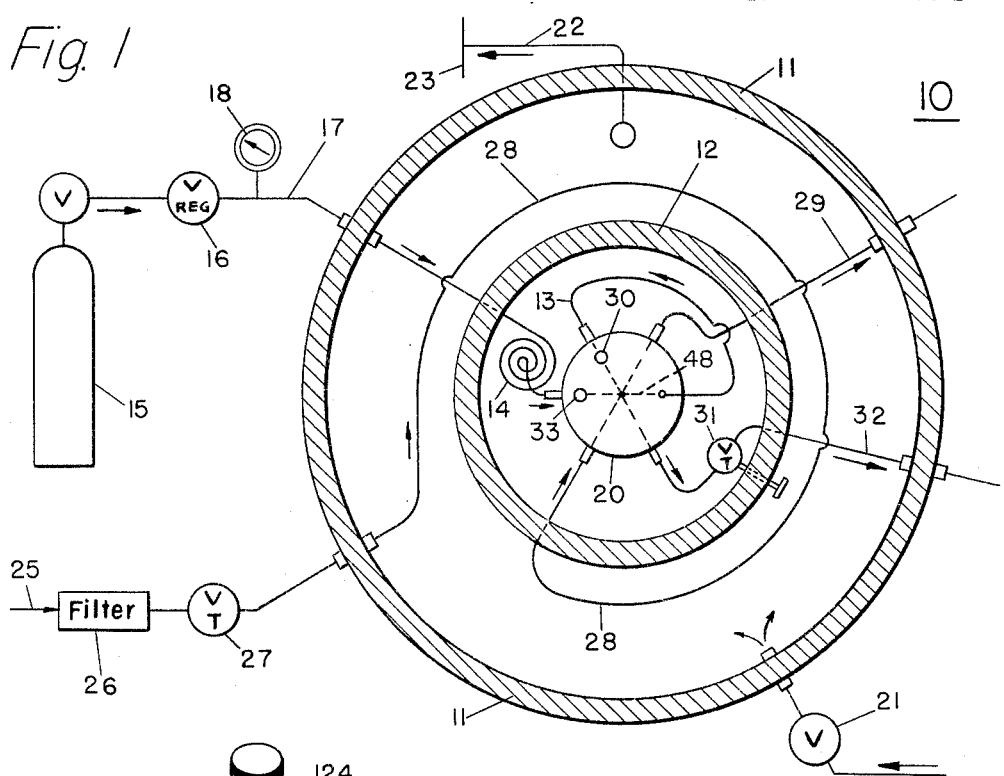

Referring now to FIG. 1, the analyzer assembly 10 is disposed within an explosion-proof housing 11 of cast aluminum. Within the main housing 11 is a second housing 12 of cast aluminum. The inner chamber is provided with a heating means, as for example, heating resistors (not shown) disposed within or around the housing 12 to maintain that housing and the chamber within it at a uniform temperature as determined by the setting of associated control thermostats. Within the inner housing 12 is disposed the chromatographic column 13, together with a preheat coil 14 for carrier gas supplied from any suitable source, such for example, as from a tank 15 of helium. By means of a pressure regulator 16 of the constant pressure outlet type, carrier gas will flow at a predetermined rate by way of line 17 to the preheat coil 14. The pressure on line 17 is indicated by a pressure gage 18. As will be later explained, helium flows at a substantially constant rate for all positions of the sample-introducing valve 20; that is to say, the connection from the preheat coil 14 to the column 13 is at all times completed. The outer chamber may be purged by introduction of air as by opening a valve 21. That chamber has an outlet by way of a line 22 to a flame arrester 23.

Figure 4:
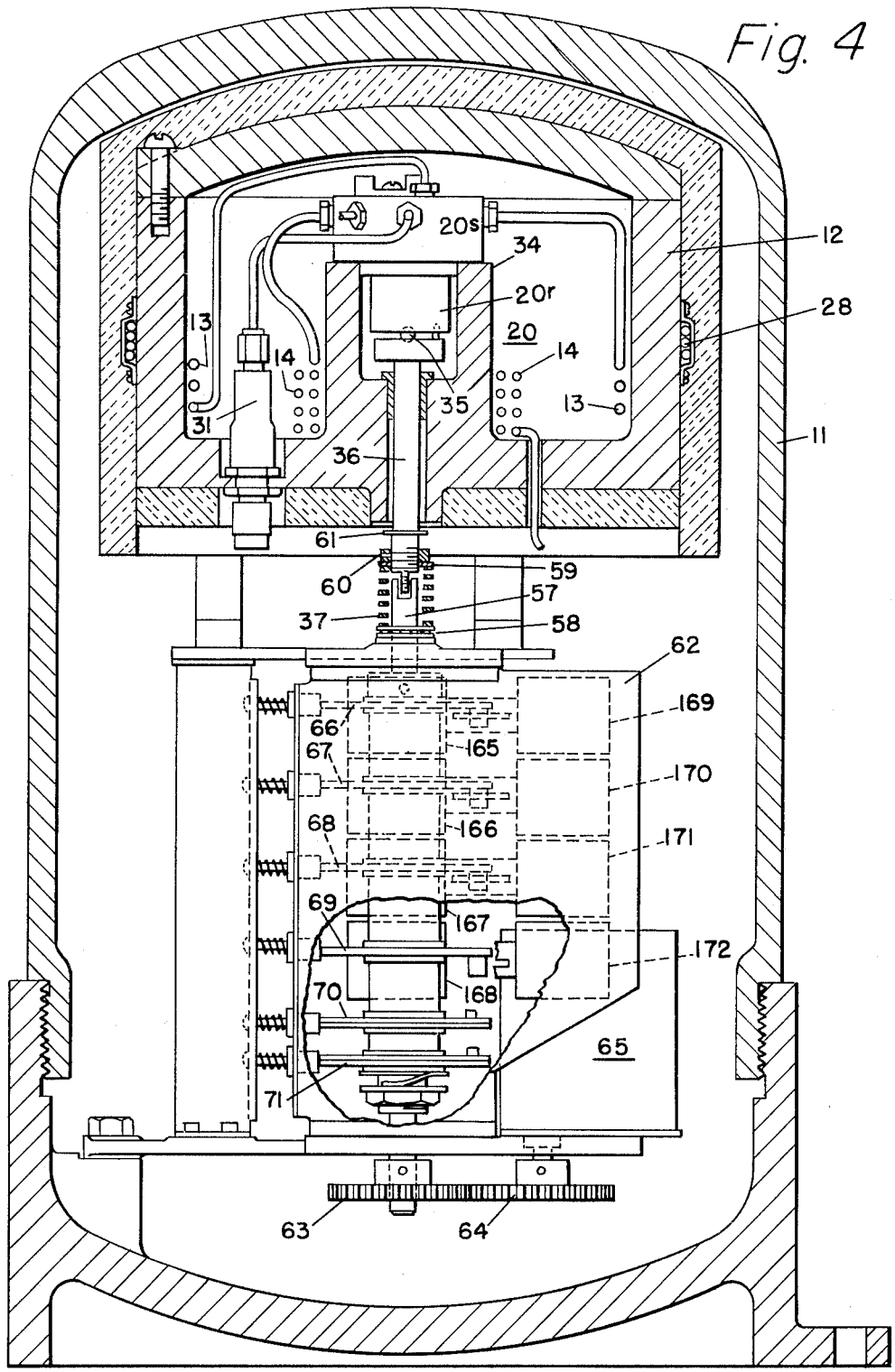
FIG. 4 is a sectional view of the explosion-proof enclosure and the parts located internally thereof.

In the preferred form of the invention, the gas to be analyzed is supplied from a line 25 by way of a filter 26 and a throttling valve 27. The sample gas flows through a preheater coil 28 which is preferably in intimate heat conducting relation with the inner housing 12 (as shown in FIG. 4). The sample gas flows continuously through a stationary part of the valve 20 and is discharged by way of a line 29 to atmosphere. Similarly, the carrier gas and sample as delivered from the column 13 after passing through a measuring cell 30 and a throttling valve 31 is discharged to atmosphere by way of a line 32. It is to be noted that a reference cell 33 is disposed in the flow path of the carrier gas as it enters the stationary portion of the sample-introducing valve 20.

As best shown in FIG. 4, the column 13 may take the form of a plurality of turns of an inert tubing, preferably of a synthetic material, such as "Teflon," disposed in juxtaposition with the wall 12 of the inner chamber. The preheater coil 14 comprises a multiplicity of turns of inert tubing, preferably of "Teflon" or other synthetic plastic, disposed around a cylindrical enclosing wall 34 supporting the sample-introducing valve 20. The preheater coil 14 will preferably be of substantial length, say 20 feet or so, while the length of the column 13 and its diameter will be determined by the particular applications for which the analyzer assembly is to be utilized. The preheater coil 14 is non-metallic to maintain more uniformly the temperature of the carrier gas and to avoid rapid transfer of heat to the carrier gas, as for example, as may occur upon successive energization and deenergization of the associated heater coils. While metallic tubing may be utilized for the preheater coil, it has been found that greater uniformity of temperature of the carrier gas is achieved with non-metallic tubing.

The sample-introducing valve 20, FIG. 6 has a stationary part 20s, previously referred to, and a rotating part 20r supported on a thrust bearing shown as a spherical bearing element 35 which nests within conical recesses provided respectively in the rotatable element 20r and in a driving element 40 carried by shaft 36 biased upwardly by a relatively strong compression spring 37, FIG. 4. This spring 37 maintains the upper, flat portion of the rotatable valve element 20r against a cooperating flat surface of the stationary portion 20s of the valve. The latter is preferably made of stainless steel, and the rotatable element 20r comprises an assembly including an inner portion of polytetrafluoroethylene available under the trademark of "Teflon" which, as best shown in FIG. 6, is enclosed within a metallic cup 38. The lower portion of the cup 38 has a slot 38a into which extends a pin 39 driven by the driving element 40 carried by the upper end of the shaft 36. The inner "Teflon" portion is an element 41 which has a cavity or measuring chamber 42 sealed by a plate 43 and a gasket 44 under the pressure developed by a screw 45. In this manner the volume of chamber 42 may be held to close tolerances, and as will be later described, the measuring chamber 42 of sample-introducing valve 20 assures reproducibility of the volume of the sample gas introduced into the chromatographic column.

In FIG. 6 the shaft 36 has rotated driving element 40 to a position to establish communication between lines 46 and 47 which connect with the flow passage 48 formed within the stationary portion 20s of the valve 20. This flow passage 48 includes a restriction 49 for introducing resistance to flow of the carrier gas greatly exceeding the resistance to flow of that carrier gas by way of the passage 46, chamber 42, and passage 47. On the other hand, when the rotatable element 20r of the valve is in a position in which the channels 46 and 47 are closed, carrier gas continues to flow through the restriction 49 and outwardly through the column 13, FIGS. 1 and 2. This column, as indicated above, is packed with a selected material for producing sequential elution of the several components of the sample gas and, accordingly, gives rise to considerable resistance to flow of the carrier gas and the sample throughout its substantial length. The restriction 49 introduces a flow resistance of lesser magnitude than the column itself, and so much so that there can be establishment of the connections 46 and 47 in parallel with the flow restriction 49 so that there is minimum and negligible change of flow of carrier gas regardless of the position of the valve. The carrier gas entering the stationary portion 20s of the valve is through flow passage 48 in communication with the reference cell 33, details of which are shown in FIG. 3, it being understood that the chamber within which the reference cell is disposed is made gas-tight, FIG. 6, by reason of the forced fit between the valve body and a "Teflon" sleeve 51 and a seal between that sleeve and the supporting head of the reference cell. The latter seal is produced by pressure developed upon the flanged upper wall of the reference cell by a cell retainer plate 50. This plate is pressed against the upper wall of the reference cell as by fastening screws (not shown) threaded into the stainless steel stationary member of the valve to press that wall against the "Teflon" sleeve 51. It is to be understood that the measuring cell 30, FIG. 1, will be similarly mounted in the valve body and that for that cell as well as the reference cell 33, the "Teflon" sleeve will provide desired electrical insulation, as well as performing the above-described sealing functions.

Referring now to FIG. 2, the rotatable element 20r of the sample-introducing valve 20 has been shown in a position establishing communication between the sample flow passage 52 and the measuring chamber 42 of the rotatable element. The connection extends by way of flow passages 53 and 54 which form a by-pass connection around a flow restriction 55 in line 52. Thus, the sample flowing from the preheater coil 28 (FIGS. 1 and 4) flows at constant rate by way of passage 52, and the restriction 55, to the exit line 29. With the valve in the illustrated position, however, the resistance to flow by way of the parallel path established by the measuring chamber 42 of element 20r and the flow connections 53 and 54 is materially less than through restriction 55 and accordingly, the chamber 42 will be flushed and filled with sample gas. As the rotatable element 20r is moved, in the direction indicated by the arrow, FIG. 2, to seal off the chamber 42 by interrupting its connections with the flow channels 53 and 54, there will be trapped in the chamber 42 and its sealed passageways a constant and predetermined volume of the sample gas.

It will be recalled that the rotatable element 20r is driven by shaft 36 and the eccentric driving pin 39. Thus, rotatable element 20r may be driven at constant speed as from a timing motor, though step-by-step operation can in some instances be utilized. In any event, as the rotatable element 20r arrives in the position illustrated in FIG. 6, the carrier gas is applied to the inlet 46 to the chamber 42 which forces the sample to flow from that chamber and into the column 13 by way of the flow passage 47. The whole of the sample is quickly purged from the measuring chamber 42 and forced into the column 13.

Though the measuring elements have been omitted from FIG. 2, nevertheless the reference numerals 30 and 33 have been applied to the chambers adapted to receive them in order clearly to identify their positions in FIG. 2. As mentioned above, the reference cell 33 is exposed to the carrier gas, and the measuring cell 30 is exposed to gas delivered thereto from the chromatographic column 13.

Referring again to FIG. 4, the lower end of shaft 36 is coupled to a drive shaft 57 by way of a slidable driving connection, such for example, as a flat key which may be formed integral with shaft 36 and which nests within a cooperating drive yoke or slot formed in the end of driving shaft 57. The spring 37 at its lower end bears against a thrust bearing 58 and at its upper end against a thrust washer 59 and a nut 60 threaded on the lower end of shaft 36. In this manner, the nut 60 can be adjusted to predetermine the pressure exerted by the spring 37 against the "Teflon" element 41 (FIG. 6) to assure a gas-tight connection between its upper flat face and the lower flat face of the stationary stainless steel member of the valve 20, as best shown in FIG. 6.

In the event the valve body is removed, a snap ring 61, FIG. 4, carried by the shaft 36 will engage the lower end of the cast aluminum housing 12 to limit the upward movement of the shaft 36 by the spring 37.

The drive shaft 57 is journaled in a frame 62 and has secured to it at its lower end a gear 63 meshing with a driving gear 64 driven by a timing motor 65. The drive shaft 57 carries a plurality of control cams 66–71 utilized for control of the operation of the system as a whole as will be more particularly described in connection with the wiring diagram of FIGS. 10 and 11.

Before describing in detail the programming and control system, reference is to be had to FIG. 5 where there has been diagrammatically illustrated a chart 75 on which there appears a complete chromatogram showing three peak values 76, 77 and 78. Such a chromatogram may be taken as exemplary of those obtained in gas chromatography and of the type conventionally produced by associated recorders. After the introduction of a sample into the column 13 at zero time ($t_0$), a first component eventually appears at time $t_1$ at the outlet, and as that component and carrier gas pass through the measuring cell 30, the electrical conductivity of the sensing element in the cell changes. This change in conductivity occurs as indicated by the first spike on the chromatogram having the peak value as shown at 76. The second components at time $t_2$ produces a second response of the recorder as indicated at 77 and, of course, the third component at time $t_3$ produces the peak reading at 78. Once the elapsed times $t_1$, $t_2$, and $t_3$ for the appearances of peak readings have been established for a particular sample gas, it is a characteristic of chromatographic analyses that these peak values will again appear at the same times following introduction of further samples into the chromatographic column. However, the peak values may change in magnitude depending upon change in the quantity of the component giving rise to each of the peaks. If the sample gas contains a mixture of butane, propylene, and ethane, these components will, for a given column-packing and carrier gas, appear at the outlet of the chromatographic column in reverse order. Thus, the first component giving rise to the peak value 76 will be ethane, followed by propylene and butane. As already indicated, the order can be different, depending upon the particular materials utilized in the column.

In many industrial processes it is desired to know whether or not the components vary in concentration. In accordance with the present invention, the control system may be programmed utilizing the information provided by the conventional chromatogram of FIG. 5, so that thereafter, only the peak values are indicated. These will appear as a series of distinctive marks such as dots 76a–78a. In this manner, there is retained the precision of measurement which gives rise to the chromatogram in which the variables are shown changing from minimum to maximum to minimum with intervening base line portions between component indications but without spreading the measurements along the chart. More particularly, the peak values 76–78, after the aforesaid adjustments, are recorded as dots 76a–78a in substantial alignment along the chart. With this type of recording, the chart can move slowly so that the three measurements of the chromatogram can be recorded in only that length of chart lying between adjacent dots 76a, 77a or 78a.

Further in accordance with the invention, each dot in each of the records 76a–78a may be of a distinctive color as provided by separately inked pens 81, 82 and 83. Each pen is retained in spaced relation with the record chart until a peak value has been attained, after which time the pen corresponding with the component then under measurement is brought into marking relationship with the chart.

Though marking as achieved by the pens 81–83 of FIG. 5 may be achieved in accordance with the foregoing requirements in a number of ways, the arrangements disclosed and claimed by Herbert S. Fitzgerald, a co-employee of mine, in his application Serial No. 164,582, filed January 5, 1962 and assigned to the same assignee as the present invention, are preferred and are herein illustrated in FIGS. 7–9. As shown in FIGS. 7–9, the pens 81–83 are supported by a plate 84. Each of the pens 81–83 is formed by drawing and polishing the ends of metallic tubing, preferably nickel. Each tube is soldered to the plate 84 both at the front end thereof and also where each tube passes through the plate 84 near the rear portion. From the rear part of the plate 84 the tubes extend downwardly into individual ink reservoirs 86, 87 and 88 so that each pen will be supplied with a different and distinctively colored ink. The plate 84, at its sides toward the rear portion, has two upwardly extending arms 84a and 84b. These arms 84a and 84b carry pivot pins 89 and 90, FIG. 7, which extend into or through outer arms 92a and 92b of a carriage 92. The pivot pin 89, FIG. 9, is rigidly carried by an arm 84a while the pivot pin 90 is carried by a spring arm 91 rigidly attached to the arm 84b. This spring arm 91 maintains the pens 81–83 in a predetermined position relative to the carriage and likewise provides for easy removal of the pen assembly for ease in cleaning the pens.

As best seen in FIG. 7, the pivot pins 89 and 90 extend through two arms 92a and 92b of the carriage 92. The lower ends of arms 92a and 92b, FIGS. 8 and 9, are slidably mounted on rotatable supporting rod 94 having a slot 94a milled therein along the lower portion and into which ears 92c and 92d extend to form a slidable and driving connection therewith. It is to be observed that an arm 84d secured to arm 84b extends upwardly and its upper end has a forward extension 84c which is V-shaped so that the bottom of the V rides on a print-controlling rod 95. The arm 84d has secured thereto a spring member 96 the outer end of which is disposed beneath the rod 95 for purposes later to be explained.

The arms 92a and 92b are connected by cross members 97 and one of them, the arm 92a, has an opening 92e therethrough to receive a ball 92f which is held in place by a flat spring 98 secured to arm 92a. This detent ball serves to index or accurately locate the positions of the pens relative to the chart, the ball protruding through opening 92e for cooperation with openings provided in an upstanding arm 99 forming part of a supporting member for the ink-wells. The arm 99 is connected to a second arm 100 by cross member 101 which has a bent portion forming a bottom plate on which the ink wells 86–88 rest and a slotted forwardly extending arm 102 which terminates in a pointer 103. The arms 99 and 100 are supported on the rod 94. However, the openings through the arms are cylindrical and without interlock with the notch or groove 94a of the rod 94. A depending tab 102a of arm 102 rests against the chart 75, FIG. 8, while-up-struck ears 102b ride along under a scale 72. Hence, rotation of the ink-well supporting member about shaft 94 is, for all practical purposes, prevented. A rearwardly extending projection 101a has an opening for a fastening screw 105 to clamp a violin string 179 against the projection 101a as by a clamping member 101b. Thus, there is provided a compact carriage assembly 180 slidable along rod 94 by the balancing motor of a measuring system later to be described to produce distinctive markings on the chart in accordance with the output of the chromatographic column.

As best seen in FIG. 8, when the rod 94 is rotated in a clockwise direction, it brings into registration with the chart 75 a selected one of the pens 81–83. The chart 75 is fed from a supply roll 104 and is threaded around guide rods 106, 107 and over the chart driving drum 108. With the parts in the positions illustrated in FIGS. 7 and 8, the pen 82 is in position ready to apply to the chart 75 one of the dots 76a illustrated in FIG. 5.

The pen-shifting mechanism for selectively bringing into printing position the pens 81 and 83 comprises a pair of solenoids 109 and 110. The plungers 111 and 112, FIG. 7, carry driving pins 113 and 114 which extend through horizontally disposed slots 115a and 115b of an actuating member 115 pivoted by pin 116 carried by a frame 117. The outer end of the actuating element 115 is V-shaped. As shown, there nests in the apex of the V-shaped portion a roller 118 supported by a bracket 119 carried by a leaf spring 120 which is secured at its remote end by a screw 121 to the frame 117. Pivotally connected to the actuating member 115 is an actuating rod 122, which has an end-portion 122a pivotally connected to the lower end, FIG. 8, of a link 123 which is at its opposite end secured to the rod 94.

It will be clear that when the solenoid 109 is energized the actuating member 115 is rotated in a counterclockwise direction thus pushing link 123 in a direction to turn rod 94 clockwise, FIG. 8, to bring the pen 83 into position ready for marking the chart. The registration is accurate by reason of the lower end of the plunger 111 striking a stop member 109a of the solenoid and the ball 92f, FIG. 9, moving to the front hole in arm 99. Similarly, the solenoid 110 rotates the parts from their illustrated positions in opposite directions to bring into registration with the chart 75 the pen 81.

It will be recalled that the ball type of detent mechanism above described serves precisely to locate the pens in spite of lost motion in the linkage and thus the engagement of the plungers with the stops 109a and 110a is not depended upon for precision in fixing the positions of the pens.

It is to be noted that the actuating link 123 is located, FIG. 7, near the end of the rod 94 and out of the path of the pen-assembly; hence, the foregoing registration of the pens can be effected with the carriage assembly in any position along the chart.

In FIG. 8 the pens have been illustrated in the lifted position, that is, removed or spaced from the chart 75. Any selected one of the pens may be moved into chart-engaging position—either for the printing of a dot or for continuous marking of the chart. For continuous marking it is easier to use the pen 82. As shown in FIG. 8, a solenoid 124 has its plunger 125 biased downwardly by a spring 126. Secured to the plunger 125 is an actuating rod 127 having its upper end pivotally connected to one end 131a of a print control assembly including a rod 129 which, like rod 95, extends the entire width of the chart 75. This assembly of rods 95 and end-arms 130 and 131 from a U-shaped frame having downwardly extending ears pivoted on the stationary rod 129. One of the arms 130 is located adjacent one edge of the chart, FIG. 7, while the other arm 131, FIG. 8, is positioned adjacent the other edge of the chart. It is the latter arm that has the rearwardly extending extension 131a to which the actuating link 127 is pivotally connected. Upon energization of the solenoid 124, its plunger 125 is moved upwardly to rotate the printing assembly including arms 130, 131 and cross rod 95 in a counterclockwise direction. The rod 95 is thereby moved downwardly against spring 96 which rotates the arm 84d and plate 84 in a counterclockwise direction, thereby to move the pen 82 into printing engagement with the chart. It is again to be noted that this printing operation can occur at any position of the carriage and of the pens along the chart and that the marking of the chart will occur either transiently for a dot or continuously, depending upon the time duration of energization of the solenoid 124. The spring 96 serves to press the pen 82 against the chart for continuous marking.

With the above understanding of the operation of the recorder and of the chromatograph itself, there will now be presented a description of a preferred cycle of operations of the apparatus as a whole in conjunction with the wiring diagram of FIGS. 10 and 11 and the timing chart of FIG. 12.

In FIGS. 10 and 11 all parts have been illustrated in positions for the beginning of a cycle of measurement. All solenoids are shown in their deenergized state. The rotatable element 20r of valve 20 is in position to receive sample gas to be analyzed from the supply line 25. Carrier gas flows from the supply bottle 15 by way of the regulator 16 and line 17 to the reference cell 33, thence through valve 20, the column 13, and thence through the measuring cell 30, being discharged from the system by way of the valve 31 and line 32. A fast-flush connection 140 is ineffective since solenoid-operated valve 141 is closed when the solenoid is deenergized. If line switch 142 now be closed to energize supply lines 143 and 144 and start button 145, FIG. 11, (lower right corner) is closed to energize from an alternating current source 146 the timing motor 65, it will drive a plurality of control cams 66–71, and, through a mechanical driving connection indicated by the broken line 36, will drive the rotatable member 20r of the valve 20. The starting switch 134 is manually maintained closed until a pilot light 155 (shown as a Neon bulb) is extinguished. This pilot when energized serves to indicate to operating personnel that the motor has stopped in its illustrated position. The pilot light 155 is energized by a circuit which may be traced from one side of the alternating supply source 146 by way of conductor 156, pilot light 155, normally closed contacts 71a, and by way of conductors 158 and 159 to the other side of the alternating current supply. The contacts 71a are, together with normally open contacts 71b, operated by a hold-control cam 71. The start button is released when the hold-cam 71 opens the normally closed contacts 71a, and at the same time closing the normally open contacts 71b. This movement of the control cam 71 is indicated by the extinguishment of the signal light 155 and advises the operator that the motor is running with its energizing circuit completed through holding contacts 71b. The closing of contacts 77b establishes a holding circuit for continued energization of the motor 65 for at least a single revolution of cam 71. When all of the cams are in the alignment shown, the motor will stop but as later described, if one of cams 66–69 is released, the motor continues to be energized.

It is to be observed, FIGS. 10 and 11, that a master selector switch 160 is shown in its "set" position so that its contacts 160a–160f are all in their lowermost positions. The cycle of operations determined by the "set" position of the reset means including the selector switch 160 is for the purpose of bringing all cams, 66–71, to predetermined positions. The cam 66–71 are frictionally driven by the shaft 57 driven by the motor 65. Stop pins 66f–69f are provided, one for each of the cams 66–69.

These stop pins are disposed respectively in engagement with the upturned end of arms 161–164 which, as will be later explained, are actuated to their illustrated positions by set-solenoids 165–168 which reset the cams. The arms 161–164 as part of the set means are moved to retracted position out of the way of the pins 66f–69f on the cams by release-solenoids 169–172 to set up the desired program.

It will be observed that the selector contact 160d of selector switch 160 in its illustrated lowermost position completes an energizing circuit for the pen-actuating solenoid 124 which may be traced from the supply line 143 by way of the selector contact 160d, conductors 173 and 174, solenoid 124, and by way of line 175 to the other supply line 144. Accordingly, the solenoid 124 operates to move the pen assembly downwardly and to bring into engagement with the chart 75 the intermediate one of the three pens. Thus the pen 82 as best shown in FIG. 8, is driven to a position to record continuously on the chart 75 under the control of a balancing motor 176. The balancing motor 176 through a one-way clutch 177, later to be described, drives a pulley 178 carrying a belt drive in the form of a "violin" string 179 which is secured to the carriage 180 by clamping member 101b as shown in FIGS. 6–9. With the one-way clutch deenergized, motor 176 may drive the carriage 180 in either direction across the chart.

The one-way clutch 177 may be of conventional design well understood by those skilled in the art. In FIG. 10 it has been illustrated as comprising a toothed wheel fastened to the output shaft of motor 176. Thus, if a pawl 181 is moved by a solenoid 182 when energized, to engage the teeth of the toothed wheel 177, only counter-clockwise movement of the motor can occur. If the motor 176 tries to reverse, it is stalled and the pulley 178 will remain at standstill. Thus the pen when the one-way clutch is made effective can only be driven up-scale by the balancing motor 176. It cannot be driven downscale. In practice it will be preferred to utilize a ball clutch of the over-running type. This solenoid 182 is only energized in the "run" position of selector switch 160 and with certain other switches in predetermined positions later to be described.

The selector contact 160b completes an energizing circuit from the supply line 143 via conductor 260 for a timing relay shown as of the thermal type. Thus a heating element 183 raises the temperature of a bimetallic actuating member 184 which after about fifteen seconds opens contacts 185. Prior to that time energizing circuits were completed from line 143 by way of selector switch contact 160b, conductor 260 and contacts 185 for the set solenoids 165–168 to set the arms 161–164 into their illustrated positions. After the expiration of said time interval of fifteen seconds, the contacts 185 open and the solenoids 165–168 are deenergized but the arms 161–164 remains in their illustrated positions until energization of one or more of the release solenoids 169–172. Hence, when switch 160 is initially moved to the "set" position, assuming the thermal switch is cool and the contacts 185 closed, the motor 65 will run until all of the switches 66a–69a and 71b are opened due to forced line up of the cams as produced by the stop pins 66f–69f. Hence, for subsequent set cycles, the switch 160 comprises a reset means for the programmer. In one embodiment of the invention a measuring cycle is completed in about a minute though the time may be made less or longer, as may be desired, by changing the speed of shaft 57.

Returning now to the operation of the sample-introducing valve 20, it will be remembered that as soon as it is moved from its illustrated position in FIG. 10 to the position shown in FIG. 6 the carrier gas is effective to transfer the measured charge of sample gas into column 13. The reference cell 33 and the measuring cell 30 form two arms of a balanceable bridge 195 of the Wheatstone type, FIG. 10, the cells 30 and 33 forming one pair of adjacent arms and the resistors 186 and 187 forming the opposite pair of arms. The bridge is energized from any suitable source of supply, such as a battery 188 having a rheostat 189 in series therewith. The output of the bridge is connected by way of output conductors 190 and 191 and a potentiometer 192 to the input of an amplifier 193 provided for the balancing motor 176. The potentiometer 192 has its own source of supply. The amplifier 193 and motor 176 are well understood by those skilled in the art and may be of the type illustrated in Williams Patent 2,113,164.

For convenience, the movable contact of slidewire 194, forming a part of the potentiometer circuit 192, has been illustrated as driven from the carriage 180, though in practice the slidewire will be mounted on a shaft driven by motor 176 and rotated relative to its associated stationary contact. Any change in output from the bridge 195 will apply to the amplifier 193 an error signal producing rotation of the motor 176 in a direction to drive the movable contact of slidewire 194 in a direction to reduce the error signal to zero. In practice, the operation is rapid and the motor 176 causes the pen closely to follow all changes in output from the bridge 195.

With the parts in their illustrated positions, a loading resistor 207 is connected across the bridge 195 through a circuit which extends from the movable contact of resistor 213 by way of loading resistor 207 and the contacts 199a, 200a, and 201a of relays 199–201 to the other side of the bridge. Though one side of an output resistor 210 of the bridge is connected by way of contacts 208b to the movable contact of resistor 213, the other side of that resistor (to which output conductor 191 is connected) is disconnected from the other output junction of the bridge. Thus while the output circuit including conductors 190 and 191 is disconnected from the bridge, the bridge itself has connected across it the loading resistor 207, thus preventing any changes in bridge balance due to changes in loading by reason of the substitution for the loading resistor 207 of one or another of three attenuating resistors 196, 197 and 198 respectively connected as potentiometers in respect to the output circuit.

At the time of closing the line switch 142 in supply line 143, a circuit is completed for a selector relay 199 which then operates to connect the attenuating resistor 196 across the output of bridge 195 in place of loading resistor 207. The energizing circuit for relay 199 may be traced from supply line 143 by way of selector contact 160a, conductor 203, the upper contact of an amplitude or attenuating selector switch 202, and conductor 204, the coil of relay 199 and by conductor 206 to the other supply line 144. The coil of relay 199 is shunted by a capacitor which provides a slight delay in energization of relay 199 and an increased delay in the operation of the relay from the energized to the illustrated deenergized position. The closing of relay contacts 199c completes a direct connection of resistor 196 across the output junctions of the bridge, while the closing of contacts 199d completes a connection to the movable contact of resistor or potentiometer 196, the circuit extending from that movable contact by way of contacts 199d and contacts 208a to the righthand side of the output resistor 210.

Remembering that the intermediate pen 82 of the recorder has been moved into contact with the chart and that a measured charge of the sample gas has been introduced into the chromatographic column 13, there will be a rapid change in the output of the bridge 195 as the first component from column 13 arrives at the measuring cell 30. As a result, the pen 82 will be driven from its zero position rapidly upscale to produce on the chart 95 the first peak 76. The pen will be in its zero position by reason of the fact that the output from the bridge 195 was zero due to the disconnection of output conductor 191 from one of the output junctions of the bridge. Had the peak 76 been of an amplitude less than that desired, or greater, then the movable contact on attenuating resistor 196 provides for the selection of a different fractional output from the bridge. Thus by increasing or decreasing the fractional output applied by way of conductors 190 and 191 to the amplifier 193, the height of the peak 76 may be adjusted. Similarly, by adjusting the movable contacts associated with attenuators 197 and 198, the heights of successive peaks 77 and 78 may be predetermined, that is adjusted to have values independent of the magnitudes of the other peaks.

The arrangement does not require that each of peaks 76–78 be recorded with a different one of attenuators 196–198 in circuit. If the selector switch 202 be left in its illustrated upper position, then the attenuator 196 will continue to be connected across the bridge 195, and the heights of peaks 76–78 will be recorded with the several amplitudes proportional to the change in concentration of the constituent in the sample stream giving rise to them. In practice, the attenuator selector switch 202 makes it possible to utilize many of the features of the present invention for those cases where one constituent may develop a peak of amplitude exceeding the width of the chart and also to record peaks where the attenuation of an amplitude of the foregoing charcter would produce an exceedingly small peak for another of the constituents. As a matter of fact, the purpose of the operations presently being described is graphically to present the time occurrence of the peaks to prepare for the operation of the system for the successive recording of the peaks by the series of broken-line records 76a–78a, FIG. 5. At the same time, information is secured for the manual operation of the switch 202, FIG. 10, for energization of the needed attenuation-selector relays 199–201 to meet the requirements of any given chromatographic analysis.

As well understood in chromatographic analysis, characteristic peaks may be in either direction. That is to say, in one instance the thermal conductivity of the measuring cell 30 may be increased while for another constituent the thermal conductivity may be decreased. In respect to the bridge 195, this would means that for one constituent the output of the bridge would be increased while for another constituent the output would be decreased. Since in each case the change in output of a measuring cell relative to the carrier gas is from a zero position, it will be desirable to provide reversing means for those cases were peaks in both directions occur.

The foregoing explains the purpose of the contacts 199b. When these contacts are closed by relay 199 an energizing circuit is partially completed for a relay 208. This is a reversing relay and if, for example, the first peak were of opposite direction to peak 76, then a manually operable switch 209 will be closed. This will assure the completion of the energizing circuit for relay 208 which then operates its contacts 208a and 208b, to their other positions, thereby reversing the connections from the output of the bridge to the output resistor 210 across which the output conductors 190 and 191 are connected. Similar manually operable switches 211 and 212 are provided for similar purposes in connection with the operation of relays 200 and 201 and their corresponding contacts 200b and 201b.

The bridge 195 includes a bridge-balancing resistor 213, the movable contact of which can be adjusted manually as by a knob 214 to compensate for variations in resistance as between the measuring cells 30 and 33, and for other variables. As will later be explained, the bridge also may be automatically balanced by a motor 215 under the control of a switch 216 operable from the slidewire shaft of the recorder. As diagrammatically illustrated in FIG. 10, switch 216 is actuated by an element 180a attached to the carriage 180. The additional control circuits functioning in conjuncion with the switch 216 will be later described.

It will now be assumed that the "start" button 145 has been pushed to initiate an analysis cycle and that the pen 82 is being operated toward the peak value 76. As the peak value 76 is attained, a manually operable switch 217 (FIG. 11 lower center) will be momentarily closed to complete an energizing circuit for the release solenoid 171. This solenoid thereupon withdraws the stop element 163, and the control cam 68 is then released to be driven by the motor shaft. As soon as the cam turns through half its dwell, as provided by the cam recess, the cam-roller is lifted to close the contacts 68a and 68d and to open the contacts 68b and 68c, and 68e. As each of the succeeding peak values 77 and 78 are attained, additional manually operable switches 218 and 219 may be similarly momentarily closed to energize release solenoids 170 and 169 respectively to remove from the path of the stop pins carried by cams 67 and 66 the stop arms 162 and 161. These cams 67 and 66 thereupon are rotated by the shaft 57 for the operation of their associated contacts.

At a selected part of the chromatogram, as for example, in the region 220 as shown in FIG. 5, a manually operable switch 221 (FIG. 11) is momentarilly closed to complete an energizing circuit for the release solenoid 172 associated with the arm 164 of control cam 69. This cam 69 is then rotated by shaft 57 to close its contacts 69a and to open its contacts 69b and 69c. It will be remembered that the holding circuit for the cam-driving motor 65 was initially traced by way of holding contacts 71b. The contacts 66a–69a are connected in parallel with contacts 71b. Accordingly, with differing angularity in the alignments of the cams 66–71, it will be seen that at least one set of the contacts 66a–69a will be closed at the time the cam 71 is returned to its illustrated position to open holding contacts 71b. Accordingly, the motor 65 will be continuously energized as long as the contact 160e of selector switch 160 is in its lowermost position. Accordingly, rotor 20r will continue cyclically to introduce sample gas to the analyzer and the pen 82 will continue to draw the full chromatogram, as illustrated on the lower portion of the chart 75. There will not then be produced on the chart any of the records 76a–78a best shown in FIG. 5.

In some instances it will be desirable to permit two chromatograms to be drawn by the pen 82, as for example, when one of the release solenoid actuating switches 217–219, or perhaps the switch 221, through oversight, has not been operated during the first cycle. Such switch can then be operated during the second cycle. Most of the time, however, the drawing of one chromatogram will be sufficient for successive operation of the switches 217–219 and 221 to set the several cams 66–69 in their desired positions for control of the subsequent cycles of operation later to be described.

Should one of the manually operable switches 217, 218, 219 or 221 be improperly operated, that is to say, at the wrong time, then it is necessary to move the selector switch 160 to the "run" or intermediate position and to maintain it there for a short time interval, that needed for the time delay swich 185 to be returned to its closed position after cooling of the thermostatic element 184. When this occurs, the return of the selector switch to the set position immediately energizes the set coils 165–168 to bring the arms 161–164 again to their illustrated positions. The motor 65 continues to operate until all of the cams 66–71 are returned to their illustrated positions. The motor 65 is deenergized at the end of the cycle when the hold cam 71 opens switch contacts 71b and closes contacts 71a. This event is indicated by the signal lamp 155 coming on and staying on. The start button 145 may now be operated again to initiate a cycle of operations of the kind already described so that the release-solenoid push buttons 217–219 and 221 can be properly actuated to set the several cams 66–69.

In normal operation, repeat of the set-cycle will seldom be necessary, and after the first cycle to set the cams 66–69 to their desired positions, the selector switch 160 will be operated directly to its intermediate run-position. In this position, it will be noted that the selector switch 160 through a mechanical connection, shown by the broken line 222, operates a change-of-speed switch 223 associated with a driving motor M for the chart 75. This switch, for the foregoing operations, is shown in its fast-speed position to provide for relatively rapid movement of the chart and adequate to spread the adjacent spikes of the several component peaks of the chromatogram. In the slow-speed position, the chart 75 is driven at a rate of distance per minute corresponding with the spacing between adjacent dots of any of the several records 76a–78a. The time required for the chart 75 to move the distance between adjacent marks corresponds with the cycle time of the programmer including the manually set cams 66–69.

The selector switch contact 160d in the run position deenergizes the above-traced energizing circuit for the pen-actuating solenoid 124. Accordingly, the spring 126, FIG. 8, raises the pen carriage and the pens away from the chart. The selector contact 160a in the run position completes an energizing circuit for a cam release relay 224 which may be traced from supply line 143 by way of switch contact 160a, conductor 225, the operating coil of relay 224, and by any one of contacts 66b–68b which once during each cycle are in their closed positions, and thence by conductor 226 to the other supply line 144. The relay 224 after a brief delay produced by the shunting capacitor thereupon opens its normally closed contacts 224a and closes its normally open contacts. The three lowermost normally open contacts of relay 224 complete energizing circuits respectively from supply line 143 by way of conductor 227 to the release solenoids 171–169 respectively. Thus, should there have been failure to operate one of the manually operable switches 217–219 during set operation, the release solenoids now function to move the arms 161–163 out of the path of the pins of cams 66–68.

Inasmuch as the run cycle of operations is initiated after the completion of the cycle and after the cams have been changed from their illustrated positions in FIG. 11, it will be seen that the subsequent operation of the selector switch from its set position to its run position should be made to occur at time 0, i.e., at the beginning of a new cycle of operations. Accordingly, the energization of any release solenoids not theretofore energized to a set position will be set to correspond with 0 time, and thus subsequent records will be unaffected by the operation of their corresponding control cams. To avoid the necessity of switching from the "set" position to the "run" position at time 0, it is preferable during programming, i.e. during a "set" cycle, to release any of the cams 66–68 not being used, so that they will perform their switching operations with the pen assembly at zero on the scale in order to record at the base line.

The closure of normally open contacts 224b by the relay 224 partially completes an energizing circuit by way of a conductor 228 to the pen-shifting solenoids 109 and 110. This circuit may be traced from supply line 143, switch contact 160a, now in its run position, and by way of conductors 225 and 229 connected to the contacts 66c–68c operated by cams 66–68. Though both of contacts 66c and 67c have been illustrated as closed, during the programming it will be understood that the relative angular positions of cams 66 and 67 will be changed so that by the time a peak has been attained for a component corresponding with one of the cams as produced by the balancing of bridge 195, then one or the other of contacts 66c and 67c will have been closed. Assuming, for example, that the contacts 67c have closed, then the energizing circuit just being traced continues by way of those contacts, a diode 230, conductors 231 and 232, a further diode 233, to the solenoid 110 of the pen-shifting mechanism, and thence by way of conductor 228 and contacts 224b to the other supply line 144. Thus, the solenoid 110 operates to move the pen 81 into registration with the chart preparatory to a printing operation. This will correspond to the second component coming through the column 13. Had the contacts 67c been open and the contacts 66c closed, then the energizing circuit would have been by way of a diode 234, conductors 235 and 236, a diode 237 to the solenoid 109 and thence to the other side of the line to bring into registration with the chart the pen 83.

It is to be noted that if neither of solenoids 109 nor 110 be energized, the pen 82 will remain in position for printing on the chart.

Associated with each of solenoids 109, 110 are R.C. circuit which further delay energization of these solenoids for a short time upon circuit closure and their deenergization for a longer time after the supply circuit is interrupted. Upon energization of either of them by cams 66 or 67, pen selection will be effected and the pen will remain in its operating position for a time interval after the cam opens its switches adequate to insure that the printing operation has taken place before the pen selector moves back, after which the pen carriage and pens will be returned to the neutral position with pen 82 in a position for printing.

The closure of relay contacts 224b also completes an energizing circuit for the operating solenoid 182 of the one-way clutch which may be traced from supply line 143 by way of the operating coil of solenoid 182, conductors 229, 228 and by contacts 224b to the other supply line 144. Thus, during the time the selector switch 160 is in the run position, the one-way clutch is rendered effective so that the pens may only be driven up-scale when one of contacts 66b–68b is closed. When the closet set of these contacts is moved to its open position, the circuit to relay 224 is interrupted and after a short delay produced by its shunting capacitor the contacts 224b open and the one-way clutch is deenergized, and the pen may be, and is, returned to its zero position by the balancing motor. The capacitor shunting the operating coil of relay 224 provides delayed opening of the relay to allow time for the printing or chart-marking operations to take place and delay deenergization of the one-way clutch until after the chart has been marked.

The contacts 66c–68c respectively control energizing circuits by way of diodes 234, 230 and 239 respectively and by way of the operating coils of relays 201, 200 and 199. These, it will be remembered, are the relays controlling the connection to the bridge of the attenuating circuits.

During the time the foregoing operations have taken place, it will be understood that at the beginning of each cycle of operations of the cam shaft 57 a fresh sample of gas flowing through valve 20 is delivered to the column 13. It will be helpful to consider in detail as shown by FIG. 12 the timing of the several things which take place as programmed and controlled by the control system during the time the first component is coming through giving rise to the peak value 76. In this connection, it will be noted that the time of injection of the sample into the column 13 is indicated at the right of the timing diagram of FIG. 12 by $T_0$. As the first component of the gas is being eluted and delivered to the measuring cell 30, the pen carriage 180 is prevented from moving up-scale in a normal manner, as it would be when drawing a normal chromatogram indicated by the dotted line. Its movement is delayed to follow the solid-line path 76b for reasons to be set forth. The cams 66–71 all have "dwells" of a length dependent upon their function. Cams 66–68 in particular have adjustable or fixed "dwells" each different in length thereby to insure closure of their respective switches at a proper time and for a time interval adequate to charge the printing capacitor 241, select the proper pen for recording, energize the one-way clutch 177, and connect the proper attenuator in circut as required for recording a properly located dot or other mark on the recorder chart indicative of peak-height. For sharp, well-defined peaks, the required dwell is narrower than that for broad peaks. As is well understood by those skilled in the art, the first peak to be eluted is the sharpest and narrowest peak and the subsequent peaks are usually progressively broader and less sharp. The cam for the first peak may have a dwell which may correspond in its time interval to a period slightly longer or shorter than the projected width at the base line of the steep portions of the corresponding portion of the chromatogram. For subsequent peaks the cam dwells will be longer, yet while longer than the dwell for a cam of a preceding peak the dwell may cover a time interval less than that defined by the projection of the steep portions of the curve on the base line.

As will be evident from FIG. 11, if one of the switches 217–219 is operated when the pen is in approximately peak position to release the stop arm, on the next cycle the corresponding cam switches will be operated into their illustrated positions a short time before the peak is reached and remain there until a short time after the peak has been reached. This design makes it unnecessary to push switches 217–219 precisely at the peak. For peak 76 at the time indicated by point 76a the corresponding control cam 68 of FIG. 11 arrives at a position at which the cam follower enters the recess for closure of its contacts 68b, 68c and 68e and opening of contacts 68a and 68d. These contacts remain in the positions shown for the duration of the individual component measurement which roughly corresponds with the duration of the component appearing at the measuring cell 30. The time duration, of course, is determined by the width of the recess or trough of the cam, but it will ordinarily correspond to the operation just described.

Considering now the normally open contacts 66b–68b and the normally open contacts 66c–68c operable by the control cams 66–68, it will be remembered that except at the selected interval in the cycle, all of the contacts shown closed in FIGS. 10 and 11 are normally open and all those shown open normally will be closed as a result of the set operations above described. However, shortly after the first component arrives at the measuring cell 30, and at the time indicated at 76a, the contacts 68b and 68e will return to their illustrated positions to complete by way of contacts 68e an energizing circuit from supply line 143 by way of a conductor 240, contacts 68e and by way of normally closed contacts 67d and 66d to a capacitor 241 and a current-limiting resistor 242. The printing capacitor 241 is then charged preparatory to the application of that charge by way of normally closed contacts 66d–68d and conductor 174 to the coil of the print solenoid 124 for downward operation of the pen carriage to apply a dot to the chart 75 for peak 76.

This printing operation occurs upon return of the contacts 68d to their closed position, an event which in FIG. 12 has been indicated as taking place at the time 76c. As already described, the closure of the cam contacts 68b energizes the relay 224 which by reason of the capacitor connected across its operating coil closes its normally open contacts and opens its normally closed contacts after a slight delay. Closure of contacts 224b effects energization of the one-way clutch coil 182 a fraction of a second after time 76a. Though not utilized for the first component in conjunction with cam 68, the pen selector is brought into effect upon closure of contacts 224b if prior thereto contacts 66c or 67c are closed under the control of cams 66 or 67 for the other two components.

As relay 224 closes it completes an energizing circuit through the contact 224b for the operating coil 182 of the one-way clutch 177, which thereafter limits the operation of the pen assembly 180 to up-scale only. The closure of contacts 68c completes the energizing circuit for relay 199. Relay 199 is shunted by a capacitor which is larger than that across relay 224. Thus, the contacts of relay 199 are operated after operation of the contacts of relay 224 to connect the attenuator 196 across the bridge 195. The connection of the attenuator 196 across the bridge 195 occurs at time 76d and initiates operation of the balancing motor 176 since its amplifier 193 now receives the error signal from the bridge 195 and the potentiometer 192. Since the error signal as shown in FIG. 12 is then of a relatively high order, the pen carriage 180 is rapidly driven up-scale to the peak value 76. As that peak value is passed, the error signal reverses, tending to reverse the direction of the motor 176. However, the one-way clutch 177 stalls the motor and prevents its reverse operation, and maintains the pen assembly and the pen 82 at the peak value until the printing operation which, as before indicated, occurs at the time indicated by the point 76c.

As above explained, as soon as the cam follower of cam 68 is lifted from its valley or recess, the contacts 68d are closed to complete a discharge circuit from the capacitor 241 by way of the then closed cam operated switches 66d–68d, line 174 to the operating coil of solenoid 124 and thence by way of conductors 175 and 144 to the other side of the capacitor. The discharge of the capacitor through the coil of the solenoid 124 provides adequate energy rapidly in the form of a pulse to move the pen carriage downwardly to imprint upon the chart a dot or other distinctive impression. The pen is then moved to its uppermost position by the spring 126 as explained above.

At the same time that contacts 68d were closed for the printing operation, the contacts 68c were opened to deenergize relay 199 to remove the attenuator 196 from the measuring circuit and contacts 68b were opened to deenergize the operating coil of relay 224. However, the relays 199 and 224 do not open immediately because of the time delays provided by their shunting capacitors and until after first and second short time intervals—adequate for the printing operation to have taken place. As the relay contacts 224b are opened after the first short delay, the energizing circuit for the operating coil 182 of the one-way clutch 177 is opened. The clutch is released and the motor 176 is then free to rotate in the reverse direction. It rapidly moves the pen carriage 180 downscale and to the base or zero line as indicated at 76e. After the second short time interval produced by the larger capacitor across the coil of relay 199 the contacts 199b, 199c and 199d open to disconnect the attenuator, inactivate the polarity reversal switch and reconnect the zero output of the bridge to the potentiometer 192. The system has now been operated so that the parts are in position for the arrival at the measuring cell 30 of the second component of the sample gas.

The operations for the second and third components, meaning the second and third of the selected components of the sample, are much the same as those described above, the only difference being that for the second and third components switch contacts 66c and 67c respectively when closed partially complete circuits for energizing the pen-selector solenoids 109 and 110 which respectively are effective to bring the pens 83 or 81 into registration on the chart for the production of the records 77a and 78a. It is to be noted that opening of the contacts 66c and 67c deenergizes these solenoids prior to opening of the contacts 224b which deenergizes the one-way clutch solenoid 182. The R.C. networks in parallel with the coils of relays 109 and 110 insure continued registration of the proper pen with the chart until after the marking operation and the return of pen 82 to its mid position before the one-way clutch becomes inoperative.

It is to be noted that the bridge 195 may include additional features such as a course-adjusting resistor 243 connected between the cells 30 and 33. This resistor 243 will be adjusted to compensate for major differences in resistance values of the two cells.

It is to be noted that signal lamps 244–246 are associated with relays 199–201 and each signal lamp is energized as each relay is energized. They are helpful in identifying the time occurrence of each of the components of interest from the column 13. They are also of assistance in checking the relationship of pen movement for a particular component against the programmed operation selected during the "set" cycle.

Returning now to the selector switch contact 160f, as the selector switch was moved to its run position, an energizing circuit is partially completed for the operating coil of the bridge-balancing relay 247. This circuit may be traced from supply line 143 by way of contact 160f, the conductor 248 and the operating coil of relay 247. That energizing circuit is completed upon closure of the contacts 69c operated by the cam 69. This may be programmed to occur as shown at 220 of FIGS. 5 and 10. At that time the relay 247 is energized to close its contact 247a to complete an energizing circuit for a signal lamp 249 and to close its contacts 247b to connect the bridge output by way of resistor 207 and switch 208a to the output conductor 191. Accordingly, the balancing motor 176 is energized in the event there be an error signal to move the pen towards its zero position. If the carriage 180 is not driven to the true zero scale position that is to say to the base line position on the recorder chart, the bridge balance may be adjusted as by the knob 214 until the carriage arrives at its desired base line or zero scale position. As shown, the connection of the bridge to the resistor 213 is also under the control of a reversible motor 215 with a switch 216 (adjacent the left end of the recorder FIG. 10). More particularly, upon closure of contacts 69b of control cam 69, an energizing circuit is completed from one side of the alternating current supply as indicated by the terminal 250 (adjacent the contacts 69b). The circuit extends by way of contacts 69b, conductor 251 to the motor 215. The return circuit is by way of conductors 253 and 254 to normally closed contacts 224a of relay 224 and by way of contacts 160c of the selector switch to the other alternating current supply terminal 255.

With the switch 216 in its right-hand position (as shown in FIG. 10) the reversible motor 215 will rotate in a direction to move the pen carriage 180 down-scale until the projection 180a, supported from the pen carriage, flips the switch 216 to its lefthand position. The motor 215 is then reversed by the reversing switch 216 and it starts to move up-scale. Since the switch is a snap acting switch, the motor 215 in effect oscillates about the zero position until the cam 69 opens its contacts 69b and 69c, leaving the pen carriage effectively at its zero position in that the extent of oscillation of the motor 215 about the zero position results in a low order of pen movement. In this connection, it will be noted that the interlock provided by the contacts 224a prevents a bridge-balancing operation during any period of time a selected component is being received by the measuring cell 30.

The description thus far has tacitly assumed the system as a whole to be in calibration. From time to time it may be desirable to calibrate the system; that is to say, to apply to the measuring cell 30 a reference gas having present therein components similar to those to be detected in the sample gas but present in the reference gas in known concentration. For this purpose such a reference gas will be supplied as from a line 256 through a three-way valve 25a and by way of the filter 26 and regulating valve 27 to the sample introducing valve 20. At the same time the selector switch 160 will be moved to its uppermost or calibrating position.

At any time the selector switch 160 is moved to the calibrating position, the switch contacts 160e become open circuited. The motor 65 will nevertheless continue to be energized through contacts 71b until the completion of the cycle, at which time contacts 71a and 71b arrive at the positions shown and the signal lamp 155 which indicates when the motor is stopped will again be energized. At that time the start button 145 is actuated again to start rotation of the motor 65. The start button 145 is maintained closed until the signal lamp 155 is deenergized by the opening of contacts 71a by the cam 71. At the same time the holding contacts 71b are again closed for continued operation of the motor and for the completion of the calibrating cycle. The system functions again to produce a chromatogram of the type illustrated in FIG. 5. The several peaks appearing in such a chromatogram will correspond with the peaks 76, 77 and 78 but their values on the chart will be predetermined by the advance knowledge of the concentration of the constituent in the reference gas.

As the first component arrives at the measuring cell 30 the switch 202 will be in its uppermost position to complete the above-described energizing circuit for the attenuator relay 199. Thus the component of the reference gas will produce an unbalance of the bridge 195 with the same attenuator setting as for a corresponding component of the sample gas. After the first component comes through, the switch 202 will be operated to the second position to energize the attenuator relay 200 to connect the second attenuator 197 across the bridge and after the second component comes through the switch 202 will be operated to the third position to energize the relay 201 to connect the third attenuator across the output of the bridge. There will now have been achieved a record of the peak values of the three known components contained in the reference gas.

After the reference gas has completed its transit through the measuring cell 30, the bridge 195 is adjusted for any peak value which appears incorrect in the following way. Assuming that the first component has a peak value less than it should be, then the movable contacts associated with resistors 213 and 243 are adjusted until the carriage again occupies the erroneous peak value of the first component. The contact or attenuator 196 is then adjusted until the carriage has a position corresponding with the correct peak value of the reference gas. The foregoing is repeated for each of the succeeding components which may give rise to peak values other than those desired. The bridge is then brought into balance for zero value but without change in the positions of the attenuators 196– 198. The three-way valve 25a may now be operated to return the system to the sample gas and the selector switch 160 returned to the run position. If desired, prior to returning to analysis of same in the run position the reference gas may remain connected to the analyzer until a second chromatograph has been produced for double assurance that the recalibrating operation has been successfully completed.

In some instances it may be desirable to accelerate the flow of carrier and sample gases through the column 13 and through the measuring cell 30. This may be particularly true when the components of interest are of a considerably greater volatility than other components present therein.

It will be noted that the throttling valve 31 imposes a back pressure on the cell 30 and the column 13 thereby reducing the pressure drop across the column. However, if the solenoid valve 141 be energized, there will be established a bypass by way of manually operable 3-way valve 25a and a line 258 around throttling valve 31. Thus the back pressure on the analyzer will be materially reduced greatly to accelerate the flow of gas through pipe 32 to atmosphere. It will be noted that the 3-way valve 25a in its other position connects the bypass on the up-stream side of the measuring cell 30. Thus the increased flow may be made effective either upon the column 13 alone or upon the column and the measuring cell 30. The operating coil for the solenoid valve 141 is automatically energized, providing a manually operable switch 259 is closed each time the contacts 70a of control cam 70 are in their closed position.

It is to be understood that a solenoid valve and a by-pass may be provided around the throttling valve 16 thus to apply a materially greater pressure from the pressure supply bottle 15 of carrier gas to the analyzer.

Now that the principles of the invention have been explained in terms of the operation of one embodiment of the invention, it is to be understood that the invention may be practiced by utilizing different kinds of apparatus and by means of systems of different character. For example, and referring to FIG. 13, it will be seen that the programmer comprising the cams 66–71 and their associated switching circuits may be replaced by a settable memory system shown as comprising an endless recording medium, such as a magnetic tape 300, which may be driven by the motor 65 of the system of FIGS. 10 and 11. Associated with the magnetic tape 300 are a plurality of recording heads 301 as well as a plurality of pick-up heads 302. Thus as the tape is driven at constant speed on drums 303 and 304, electrical signals may be applied from a programmer 307 to the recording heads for developing magnetic records on tape 300 at times and for time-durations corresponding to the switching functions performed by cams 66–71. The recorded switching signals as detected at the several pick-up heads 302 are then applied to individual control circuits of a bank of relays 310, only the mechanical operating links being shown by way of the broken lines, these in each case corresponding with the broken-line mechanical outputs developed by cams 66–71. Thus, during a set cycle the programmer 307 will be operated to apply to the recording medium 300 signals for producing the needed switching operations. If during a set-cycle an error should occur or if it be desired to set up a new and different cycle, then a plurality of erase heads 312 may be energized from a source 313 to wipe or remove from the record 300 the previously recorded control signals.

It will be noted that the motor 65 drives the valve 20 of the chromatograph through a worm 315 and a worm wheel 316 and the mechanical connection shown at 36. By utilizing the reduction gearing the recording medium 300 may be driven at a speed higher than that of the valve 20 but with synchronism between the position of that valve and the recording and detection of the control signals.

With this understanding of another and differing kind of programmer as illustrated in FIG. 13, it will be understood that other programming means may be utilized including optical devices and that the display means comprising the chart 75 and the marking means 81–83 will function as before, to produce the continuous-line chromatogram and later to produce peak values of signals representative of the concentration of selected constituents of the material supplied to the chromatographic column 13. This instrument is in effect a dual purpose single channel recorder which by reason of the programmer and the arrangements for controlling the pens or marking means effectively produces a multiplicity of records (four as illustrated in FIG. 5) though the recorder includes but the single input channel by way of amplifier 193.

What is claimed is:

1. A dual-purpose, single-channel recorder having marking means for producing on a record chart a continuous-line record, cyclically operated programming means operable through a set cycle and thereafter through run cycles, set means selectively operable during production of said continuous-line record for setting up the program on said programming means for subsequent recording of selected peak values of said continuous-line record, means operable under the control of said programming means for causing said marking means to produce said continuous-line record during each set cycle and during each run cycle for producing discrete marks only, each indicative of selected peak values, detecting means for a measured variable which changes from a minimum value to a plurality of peak values occurring in succession one after the other, and means connected between said detecting means and said marking means for controlling the relative movement between said marking means and said chart in accordance with said change in said measured variable.

2. The dual-purpose, single-channel recorder of claim 1 in which said marking means comprises a plurality of pens each corresponding with one of said selected peak values, one of said pens being operable into continuous engagement with said chart during said set cycle, and during said run cycle each pen being operable into momentary engagement with said chart to record in succession on said chart said selected peak values.

3. The dual-purpose, single-channel recorder of claim 2 in which driving means is provided for said chart, and means operable under the control of said programming means for driving said chart at high speed during each set cycle and at a relatively low speed during each run cycle.

4. In a chromatograph having a column through which a sample stream is to flow, the combination of a flow connection for at least the carrier gas at all times in communication with said column, said flow connection including a flow restriction, sample introducing means including a chamber of fixed volume, and flow connections adapted to be cyclically completed for flow of said carrier gas in parallel with said restriction through said chamber and thence to said column, the flow resistance of said column exceeding that of said flow restriction whereby said flow of carrier gas remains substantially constant regardless of the state of said flow connections.

5. In a system for analyzing fluids which includes a treating zone to which sample fluids are periodically supplied, the combination of a volumetric measuring valve having a sampling cavity of predetermined volume, flow connections for a sample stream completed by operation of said valve to fill said volumetric cavity and to seal the resultant predetermined volume of the sample stream therein, and means including flow connections controlled by said volumetric valve for applying a second stream to said cavity to transfer said sample to said treating zone, said flow connections for said streams each including restrictions and by-pass connections around said restrictions respectively opened and closed by operation of said valve, the flow resistance to said streams through said treating zone exceeding that produced by said flow restrictions whereby said streams have a substantially constant flow for all positions of said valve.

6. In a system for analyzing fluids which includes a treating zone to which sample fluids are periodically supplied, the combination of a volumetric measuring valve having a sampling cavity of predetermined volume, flow connections for a sample stream completed by operation of said valve to fill said volumetric cavity and to seal the resultant predetermined volume of the sample stream therein, means including flow connections controlled by said volumetric valve for applying a second stream under pressure to said cavity to transfer said sample to said treating zone, said flow connections for each of said streams each including flow restrictions and by-pass connections around said restrictions respectively opened and closed by operation of said valve, the flow resistance to said streams through said treating zone exceeding that produced by said flow restrictions individual to said streams whereby said streams have a substantially constant flow for all positions of said valve, a flow restriction normally in series with said flow restrictions of said streams for maintaining a back pressure upon said treating zone, and means for completing a by-pass connection around said last-named flow restriction.

7. The combination with a measuring system including detecting means responsive to a measured variable which in successive cycles changes in magnitude from a minimum value to a succession of peak values, and display means operable under the control of said detecting means for displaying said changes in magnitude of said measured variable, of a cyclically operable programming means for said measuring system operable through a set cycle and thereafter through run cycles, each of said cycles corresponding with a cyclic change in magnitude of said measured variable, set means selectively operable during display by said display means of the changing magnitude of said measured variable for setting up a program on said programming means during a set cycle for subsequent display of selected peak values during said run cycles, and reset means for initiating at will a set cycle for establishment by said set means during such set cycle of a new program by said programming means for subsequent run cycles.

8. The combination of claim 7 in which said set means includes control circuits, one for each of said selected peak values to be displayed during said run cycles, and means for energizing said control circuits in succession as said peaks are displayed by said display means during a set cycle to establish said program for said run cycles.

9. The combination of claim 7 in which said display means comprises a recorder having a chart, means for driving said chart at a constant selected speed, and marking means for said chart, and a one-way drive for said marking means whereby it may be driven upscale but not downscale during the time-occurrences of said peak values.

10. The combination of claim 7 in which said display means comprises a recorder having a chart, means for driving said chart at a constant selected speed, and marking means for said chart, a peak-picking one-way clutch forming a part of a driving mechanism for relative movement between said chart and said marking means, and means operable under the control of an output from said programming means for rendering said clutch ineffective for relative upscale movement of said marking means and preventing downscale movement thereof until after appearance of a selected peak value and for thereafter rendering said driving mechanism effective to permit driving of said marking means downscale prior to appearance of the next-following selected peak value.

11. The combination of claim 7 in which said measuring system is associated with a chromatographic column into which there are periodically introduced predetermined volumes of a sample gas, the components of which through elutriation are discharged in succession from said column and in which said peak values of said measured variable correspond with the concentrations respectively of said components of said sample gas.

12. The combination of claim 11 in which timing means are provided for synchronizing the operation of said programming means with said periodic introduction of said sample gas into said column, said measuring system including attenuators, one for each of said selected peaks, and means operable under the control of said programming means for selectively connecting said attenuators into said measuring system.

13. The combination of claim 7 in which said display means comprises a recorder having a chart, means for driving said chart at a constant selected speed, and a plurality of marking means for said chart for producing on said chart marks of distinctively differing color, and means operable under the control of said programming means for successively bringing into a marking position with said chart said marking means for recording of successive peak values of said measured variable in said differing colors.

14. The combination with a measuring system including detecting means responsive to a measured variable which in successive time-cycles changes in magnitude from a minimum value to a succession of peak values and display means operable under the control of said detecting means for displaying said changes in magnitude of said measured variable, of programming means providing a set cycle and run cycles, said set cycle and said run cycles each being equal in length to said time cycles, set means selectively operable during display by said display means of the changing magnitude of said measured variable for setting up a program on said means during a set cycle for subsequent display during a run cycle of the peak values of said measured variable occurring during one of said time-cycles, and reset means operable at will for initiating a set cycle having its beginning corresponding with the beginning of one of said time-cycles for establishment by said set means during such set cycle of a new program by said programming means for subsequent run cycles.

15. The combination of claim 14 in which said programming means includes an endless recording medium, and in which said set means includes means for recording on said medium signals representative of said program.

16. The combination of claim 15 in which said recording medium is a magnetic tape, said set means includes recording heads for said tape and said reset means includes erasing heads for said tape.

References Cited by the Examiner

UNITED STATES PATENTS

| | | | |
|---|---|---|---|
| 2,778,711 | 1/57 | Fielden | 346—46 X |
| 2,899,258 | 8/59 | Spracklen | 346—45 |
| 3,009,864 | 11/61 | Webb | 73—23.1 |
| 3,023,605 | 3/62 | Burk | 73—23 |
| 3,026,712 | 3/62 | Atwood et al. | 73—23 |
| 3,101,606 | 8/63 | Roof | 73—23.1 |

OTHER REFERENCES

Simmons et al.: Analytical Chemistry, vol. 30, No. 1, Jan. 1958, pages 32 to 35.

RICHARD C. QUEISSER, *Primary Examiner.*

ROBERT L. EVANS, *Examiner.*